UNITED STATES PATENT OFFICE.

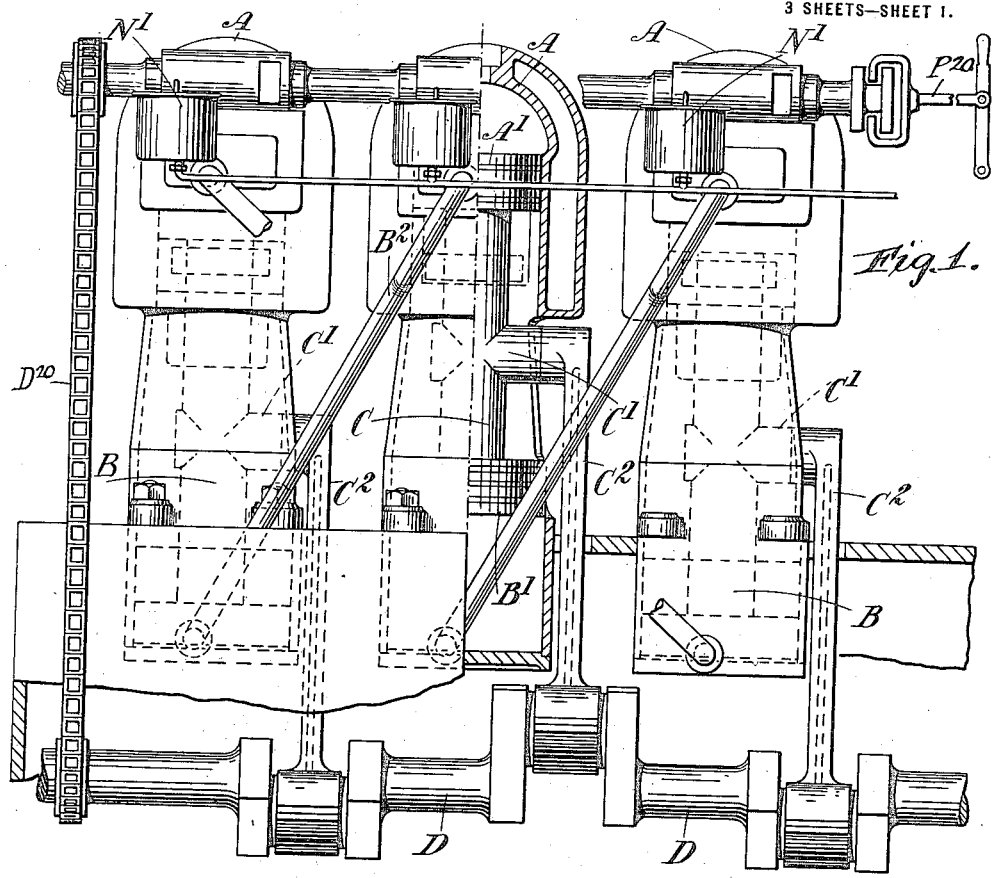
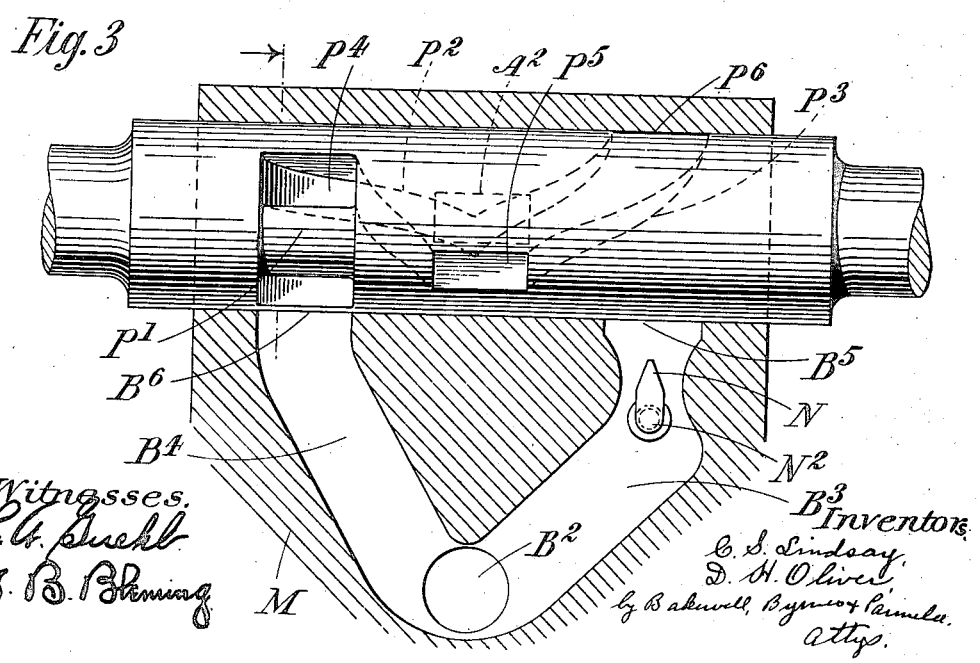

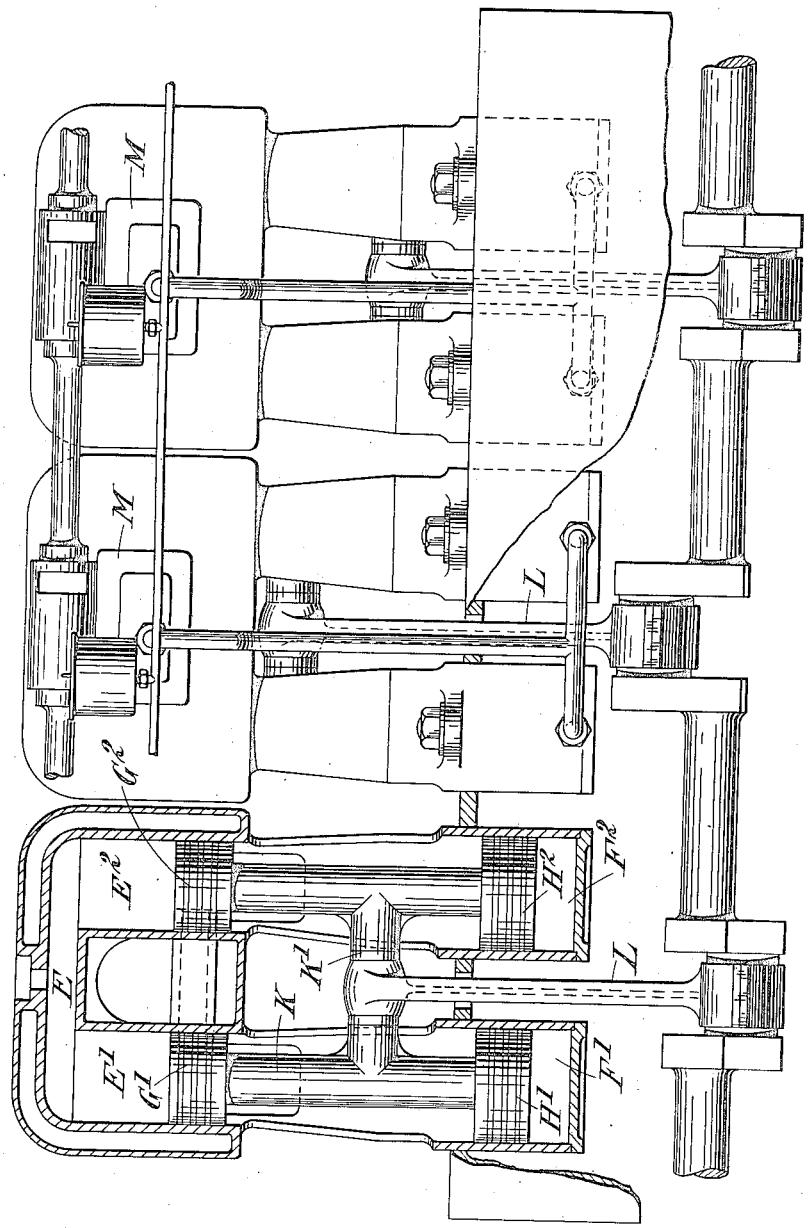

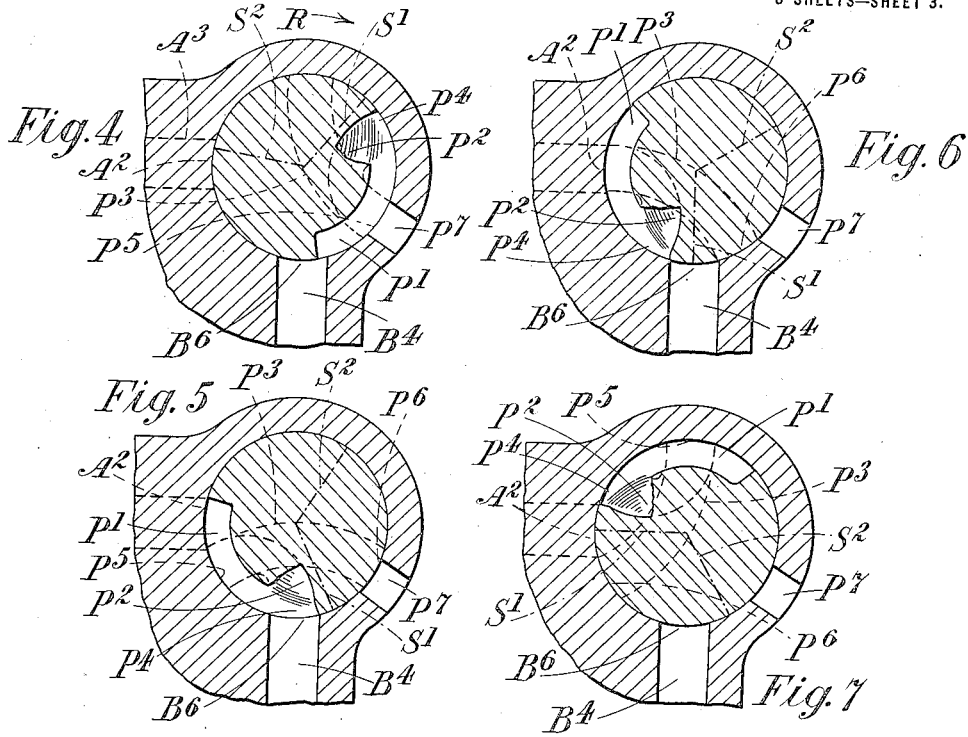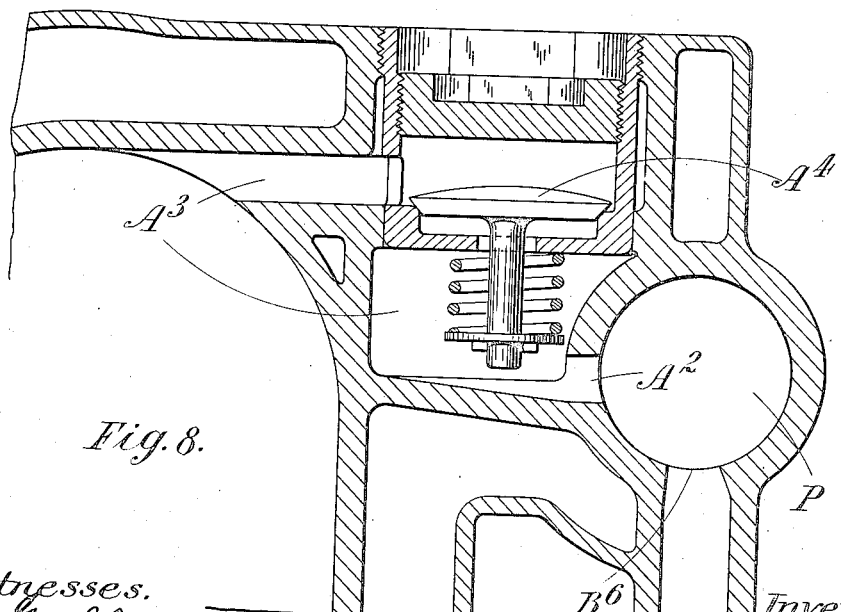

CHARLES SCOTT LINDSAY AND DOUGLAS HEDLEY OLIVER, OF LONDON, ENGLAND.

INTERNAL-COMBUSTION ENGINE.

1,140,384.

Specification of Letters Patent. Patented May 25, 1915.

Application filed September 3, 1913. Serial No. 787,870.

*To all whom it may concern:*

Be it known that we, CHARLES SCOTT LINDSAY and DOUGLAS HEDLEY OLIVER, subjects of the King of England, and residing in London, England, respectively, have invented certain new and useful Improvements in Internal-Combustion Engines, of which the following is a specification.

This invention is for improvements in or relating to internal-combustion engines which operate on the two-stroke-cycle and has for its object to produce an improved form of engine which will give a greater power for its weight and cylinder capacity than is obtained from the two-cycle engines hitherto made.

The present invention comprises in a two-cycle internal-combustion engine the combination with a single-ended explosion-cylinder of an opposed single-ended pump-cylinder with its closed end directed away from the explosion-cylinder, a piston with one end in the explosion-cylinder and the other end in the pump-cylinder, said piston being connected at the point between its ends to the crank-shaft of the engine. In a multi-cylinder engine of this kind each explosion-cylinder may be arranged to receive its charge of air from the pump of another cylinder so that a phase displacement other than 180° between the compressor piston and the explosion-piston can be obtained.

According to another feature of the invention there is employed in a two-cycle combustion engine having an air compressor for each combustion cylinder a distributing and controlling valve operated by the engine to control simultaneously the supply of air to and from the compressor and the supply of air and mixture to the explosion cylinders; the valve may also be adapted to serve as the throttle of the engine.

According to another feature of the invention there is used in combination with a single compressor and two air conduits therefrom, to one of which fuel can be admitted, a rotary valve arranged to control both conduits. If desired a single conduit may be divided into two branches at the top and the single valve and its casing be provided with ports and passages for the suction of plain air, delivery of compressed plain air, and delivery of compressed carbureted air respectively.

The carburation of the compressed air in one of the conduits or in one branch of the single conduit is effected by a jet fed from a float feed chamber and according to another feature of the invention a non-return valve is provided in the conduit supplying the jet or in the jet itself to prevent the liquid being forced backward into the float chamber when compressed air is admitted to the conduit.

The single controlling valve above mentioned may according to this invention comprise a cylindrical plug having passages adapted to register respectively with the plain-air branch and carbureted air branch of the compressed air supply-pipe and to put them in communication with the explosion-cylinder by one or more ports therein. This valve may be adapted for axial movement so that the ports in the valve and in the casing are displaced from full registration with one another and the rotary valve thereby serves as a throttle. If desired also the ports in the valve or in the casing or in both may be tapered in the manner hereinafter described.

A non-return valve may be situated between the explosion-chamber and the rotary valve to protect the latter from exposure to the ignited gases in the explosion-chamber.

In the accompanying drawings—Figure 1 is an elevation partly in section, showing a three-cylinder engine constructed in accordance with this invention; Fig. 2 is a similar view of a modified construction; Fig. 3 is a side view of the rotary valve; Figs. 4–7 are diagrammatic views of the rotary valve in different positions. Fig. 8 is a section through the inlet port to the cylinder showing the non-return valve above mentioned.

Like reference characters indicate like parts throughout the drawings.

Referring to Fig. 1, the explosion-cylinders A are mounted on a suitable frame with their open end downward and a compressor cylinder B is mounted in the same axial line beneath each explosion-cylinder A, with its open end pointing upward toward the explosion-cylinder. Since the three sections of the engine are alike the description will now be confined to one of them. The pistons $A^1$, $B^1$ of the explosion and compression cylinders respectively are directly coupled together by a member C which is provided with a lateral extension $C^1$ about the middle of its length on which is mounted a connecting rod $C^2$ whereby these two pistons are coupled to the crank-shaft D. The lateral projection $C^1$, is of sufficient length to accommodate the connecting rod outside the air compressor cylinder and is of the requisite strength to transmit the power developed in the explosion-cylinder to the crank-shaft.

The compressor-cylinder B, may be of the same diameter as the working cylinder although it is preferred to make it somewhat larger in order that there may be a surplus of air available for scavenging the explosion-cylinder supplied by the pump. If desired each compression cylinder may be arranged to supply the explosion-cylinder situated directly above it but it is preferred to connect it to one of the other explosion-cylinders so that a phase displacement is obtained in the motion of the compressor piston and explosion piston.

In the construction illustrated in Fig. 2, the explosion-cylinders $E^1$, $E^2$ are arranged in pairs with a common combustion chamber E. Each cylinder, however, has a corresponding compressor-cylinder $F^1$, $F^2$ arranged in the same axial line and beneath them. The four pistons $G^1$, $G^2$, $H^1$, $H^2$ are all coupled together by an H-shaped member K on the transverse portion $K^1$ of which is mounted the connecting rod L to couple the pistons to the crank-shaft. It will be appreciated that in this construction a balanced thrust is obtained on the member $K^1$, and the whole construction of each section of the engine is symmetrical. In other respects this engine is similar to that illustrated in Fig. 1 to which the following description refers.

The compressed air is delivered from the compressor cylinder B, by the coundit $B^2$ to a valve chest M mounted on the side of each explosion-cylinder (Fig. 1) near its upper end.

Referring to Fig. 3, the conduit $B^2$ is divided within the valve-chamber M into two passages $B^3$ and $B^4$ which terminate in ports $B^5$, $B^6$ respectively, in the seating of a rotary valve P. Within the passage $B^3$ is situated a jet N, through which fuel is supplied from a float feed chamber $N^1$, situated beside the valve-chest. This jet acts in the ordinary way, i. e., when air is caused to flow upward through the passage $B^3$, past the jet, some fuel is caused to flow out and the air is carbureted. A non-return valve $N^2$ is provided in the base of the jet to prevent the liquid being forced back from the jet into the float feed chamber when the passage $B^3$ is filled with air under a pressure greater than that of the atmosphere.

In the upper part of the valve-chamber M a cylindrical bore is provided to serve as a seating for the rotary valve P, and it is into this bore that the ports $B^5$, $B^6$ above-mentioned open. The port $A^2$ (see Fig. 8) and a passage $A^3$ provide communication between the combustion chamber A and this bore. If desired a non-return valve $A^4$ may be provided (see Fig. 8) in the passage $A^3$ to protect the rotary valve P against the action of hot gases generated in the cylinder during the explosion stroke.

The valve P as illustrated in Fig. 3 is provided with a circumferential groove $P^1$ and with internal passages $P^2$ $P^3$ providing communication between ports $P^4$ $P^5$ and $P^6$. The function of this valve, is, as mentioned above, to control simultaneously, the supply of air to and from the compressor and the supply of air and mixture to the explosion cylinders. The rotary valve P is made adjustable in its casing so that the ports in the valve can be made to register more or less with the ports in the valve chamber; this longitudinal movement may be given to it by means of a device $P^{20}$ coupled to the end of the valve spindle. This valve P may thus be made to serve as a throttle valve for the engine. The valve P is coupled to the crank shaft by a chain $D^{20}$ (Fig. 1) so that the valve rotates synchronously with the crank shaft.

It will be understood that skew or other gearing may be used in place of the chain drive.

The operation of this engine is as follows:—Considering the explosion piston $A^1$ at the top of its stroke, ignition occurs and the piston is forced downward. As the piston approaches the bottom of its stroke it uncovers the exhaust port and a considerable portion of the exhaust gas escapes. The rotary valve has then moved around to such a position that the port $P^4$ is open to the passage $B^4$ by which plain compressed air is delivered from the compressor to the port $B^6$ in the valve face. This air passes thence by the port $P^4$ in the valve and passage $P^2$ to the port $P^5$ which is approaching and is partly open to the port $A^2$ communicating with the cylinder so that a charge of scavenging air is admitted, to assist in clearing out the exhaust gases. When the piston reaches the bottom of its stroke the port $P^6$ commences to register with the port $B^5$ of the passage $B^3$ and communication is provided by the passage $P^3$ through the port $P^5$ which still registers with the cylinder port $A^2$. As the piston $A^1$ moves upward the port $P^5$ moves out of register with the port $A^2$ and so closes the cylinder completely. The piston continues to move upward and compresses the charge until it reaches the top of its stroke when ignition takes place in the usual way and the cycle of operations is repeated. The cycle is the same in each of the cylinders, and the respective cranks are set at 120° so that a uniform torque and a satisfactorily balanced engine are obtained. The rotary valve P is also used to control the air inlet to the compressor as hereinbefore mentioned. A port P⁷ is provided in the valve chest opening to atmosphere and it is positioned in the same transverse plane as the port B⁶, also the peripheral groove P¹ on the valve lies in the same transverse plane so that during the rotation of the valve communication is established for the required period between the ports P⁷ and B⁶ so that air can be drawn into the compressor on its suction stroke. The delivery of air from the compressor is controlled by the ports P⁴ P⁶ in the valve in the manner above described.

It will be understood that the arrangement and positioning of the ports and passages relating to this valve P may be varied within considerable limits. As shown in Figs. 4–7 the valve is so arranged that each cylinder is supplied from a compressor whose crank is 120° behind it in the direction of rotation of the main shaft, the direction of rotation of the valve being indicated by the arrow R. For convenience it is assumed that the crank-shaft revolves in the same direction and the positions of the cranks of a working piston and its corresponding compressor piston are indicated on the valve at S¹ and S². In considering these figures it will be remembered that the explosion cylinder is situated above the crank-shaft and the compressor cylinder below the crank-shaft.

In Fig. 4 the working piston has moved downward a short distance on its explosion stroke. The compressor piston as indicated by its crank S² is about half-way up on its suction stroke and it has commenced to suck in air from the passage P⁷ through the groove P¹ to the port B⁶.

Fig. 5 illustrates the position somewhat later on the power stroke of the explosion piston. An exhaust port in the cylinder has just been opened by the piston uncovering it and the major portion of the exhaust gas has been allowed to escape. The scavenging charge is about to be admitted from the compressor by the passage B⁴ port B⁶ into the valve by the port P⁴ and thence by the passage P² to the port P⁵ which is coming into register with the cylinder port A². The compressor piston has completed its upward or suction stroke at which point the air inlet by the groove P¹ was cut off, and the piston has moved slightly downward on its compression stroke.

Fig. 6 shows the position of the valve when the explosion piston has reached the bottom of its stroke. The supply of scavenging air has been cut off, and the explosive mixture is about to be forced into the cylinder by air being delivered from the compressor through the passage B³ where it is carbureted and when it passes by the ports B⁵ P⁶ into the passage P³ in the valve through which it passes to the ports P⁵ and A² and the explosion cylinder. This path of communication is closed when the working piston has moved up a short distance on its compression stroke. The working cylinder is then completely closed and compression commences, continuing until the piston reaches the top of its stroke when ignition takes place and the cycle is repeated.

Fig. 7 shows the position of the valve when the working piston is half-way up on its compression stroke. It will be seen that all the ports are closed for both the working cylinder and the compressor in each of which compression is taking place.

The above description of a construction of engine according to the present invention has been given by way of example and it will be understood that modifications may be made in the details of the engine itself and in the arrangement of the valve without departing from the spirit or scope of the invention, as set forth in the appended claims.

What we claim as our invention and desire to secure by Letters Patent is:—

1. In a two-cycle internal combustion engine the combination of a plurality of explosion cylinders, an equal number of open-ended pump-cylinders, disposed one opposite each of said explosion cylinders with its closed end directed away therefrom, a piston common to each explosion cylinder and its corresponding pump-cylinder, a conduit connecting each pump-cylinder with an explosion cylinder, and a single distributing and controlling valve controlling the supply of air to and from said pump cylinders and the supply of scavenging air and mixture to said explosion cylinders substantially as set forth.

2. In a two-cycle internal combustion engine the combination of an open-ended explosion cylinder, an opposed open-ended pump-cylinder having its closed end directed away from said explosion cylinder, a piston having one end in said explosion cylinder and the other end in said pump cylinder, a crank-shaft, means operatively connecting said crank-shaft to said piston at a point between its ends, a bifurcated conduit connecting said pump cylinder to said explosion cylinder, a fuel-supply device in one branch of said conduit, and a single distributing and controlling valve controlling the supply of air to and from said pump cylinder and the supply of scavenging air and explosive mixture to said explosive cylinder, substantially as set forth.

3. In a two-cycle internal combustion engine the combination of, a plurality of single-ended explosion cylinders, an open-ended pump-cylinder disposed opposite each explosion cylinder and having its closed end directed away therefrom, a piston having one end in said explosion cylinder and the other end in said pump cylinder, a crank-shaft, means operatively connecting said crank shaft to said piston at a point between its ends, a bifurcated conduit connecting each pump cylinder to an explosion cylinder, a fuel supply device in one branch of said conduit, a single distributing and controlling valve controlling the supply of air to and from said pump cylinder and the supply of scavenging air and explosive mixture to said explosive cylinder, a cylinder port, and a non-return valve situated in the fuel supply device substantially as set forth.

4. In a two-cycle internal combustion engine the combination of, a plurality of explosion cylinders, an equal number of open-ended pump-cylinders disposed one opposite each of said explosion cylinders, with its closed end directed away therefrom, a piston common to each explosion cylinder and its corresponding pump-cylinder, a bifurcated conduit connecting each pump cylinder with an explosion cylinder and a single distributing and controlling valve, controlling ports allocated one to each compressor and communicating with atmosphere, further ports one of which communicates with each of the working cylinders and pairs of ports communicating with the branches of each of the said bifurcated conduits substantially as set forth.

5. In a two-cycle internal combustion engine the combination, of an open-ended explosion cylinder, an opposed open-ended pump cylinder having its closed end directed away from the explosion cylinder, a piston having one end in said explosion cylinder and the other end in said pump cylinder, a crank-shaft, means operatively connecting said crank-shaft to said piston at a point between its ends, a cylindrical valve chest adjacent said cylinder, a bifurcated conduit connected to the pump cylinder and opening into ports longitudinally disposed in said valve-chest, a further port in said valve chest communicating with atmosphere, and situated in the same transverse plane of said valve chest as one of said ports of the bifurcated conduit from the compressor, a port spaced longitudinally from said other ports and communicating with said explosion cylinder, a fuel supply device in the branch to the other of said ports of said bifurcated conduit, a cylindrical valve in said valve chest, an internal passage in said valve having three outlets on the circumferential face thereof, said outlets being spaced longitudinally apart, and in the same transverse planes respectively as the cylinder port and the ports for the bifurcated conduit in said valve chest, a partial circumferential groove communicating with one of the outlets of said internal passage in said valve and in the same transverse plane as the port open to atmosphere in said valve chest, means operatively connecting said rotary valve to said crank shaft, controlling means operating to move said valve longitudinally, substantially as set forth.

In testimony whereof we have signed our names to this specification in the presence of two subscribing witnesses.

CHARLES SCOTT LINDSAY.
DOUGLAS HEDLEY OLIVER.

Witnesses:
O. J. WORTH,
W. E. ROGERS.